US006839227B1

(12) United States Patent
Correa

(10) Patent No.: US 6,839,227 B1
(45) Date of Patent: Jan. 4, 2005

(54) COMPUTER MONITOR UTILITY ASSEMBLY

(76) Inventor: Carlos Correa, 5756 West Park Rd., Hollywood, FL (US) 33021

( * ) Notice: Subject to any disclaimer, the term of this patent is extended or adjusted under 35 U.S.C. 154(b) by 381 days.

(21) Appl. No.: 10/042,695

(22) Filed: Apr. 1, 2001

Related U.S. Application Data

(63) Continuation-in-part of application No. 09/504,355, filed on Feb. 15, 2000, now abandoned, which is a continuation of application No. 09/103,194, filed on Jun. 23, 1998, now Pat. No. 6,024,337, which is a continuation-in-part of application No. 08/642,928, filed on May 9, 1996, now Pat. No. 5,769,378.

(51) Int. Cl.[7] .................................................. G06F 1/16
(52) U.S. Cl. ...................... 361/683; 248/918; 248/457; 361/724
(58) Field of Search ................................ 361/683–687, 361/724–727; 248/442.2, 918, 282.1, 457–460

(56) References Cited

U.S. PATENT DOCUMENTS

| | | | | |
|---|---|---|---|---|
| 5,212,628 A | * | 5/1993 | Bradbury | 361/683 |
| 5,294,994 A | * | 3/1994 | Robinson et al. | 348/825 |
| 5,437,367 A | * | 8/1995 | Martin | 206/320 |
| 5,717,566 A | * | 2/1998 | Tao | 361/681 |
| 5,978,211 A | * | 11/1999 | Hong | 361/683 |
| 6,024,337 A | * | 2/2000 | Correa | 248/442.2 |
| 6,597,568 B2 | * | 7/2003 | Ryder | 361/683 |

* cited by examiner

Primary Examiner—Hung Van Duong
(74) Attorney, Agent, or Firm—Malloy & Malloy, P.A.

(57) ABSTRACT

The present invention is directed towards a computer monitor utility assembly to be used with a standard computer monitor. The computer monitor utility assembly includes primarily a universal mount base which is structured and disposed to be removably, yet securely attached to the top surface of the monitor, and to a generally rigid top panel having a width generally equivalent to a width of a screen of the monitor. The top panel is adjustably secured to the mount base in overlying relation atop the monitor and so as to be able to slide forward and backward relative to the mount base, thereby selectively overhanging beyond the front surface of the monitor and providing shade to the monitor screen from light and glare. Further, the improved computer monitor utility assembly includes a utility console. The utility console is structured to effectively and operatively contain a plurality of peripheral articles, such as computer speakers, a microphone or a camera in an operative and modular fashion that permits facilitated expansion or modification of the system capacities. The utility console is secured to the top panel and is concealed by a lip of the front panel so as to provide a concealed and aesthetically pleasing appearance, while still providing necessary accessibility for use of the peripheral components integrated with the utility console.

44 Claims, 15 Drawing Sheets

COMPUTER MONITOR UTILITY ASSEMBLY

CLAIM OF PRIORITY

The present application is a Continuation-In-Part to an earlier filed U.S. patent application having Ser. No. 09/504,355 which was filed on Feb. 15, 2000, now abandoned, which is a Continuation to U.S. patent application having Ser. No. 09/103,194 which was filed on Jun. 23, 1998, which matured into U.S. Pat. No. 6,024,337 on Feb. 15, 2000, which is a Continuation-In-Part of U.S. patent application Ser. No. 08/642,928 which was filed on May 9, 1996, which matured on Jun. 23, 1998 as U.S. Pat. No. 5,769,378.

BACKGROUND OF THE INVENTION

1. Field of the Invention

The present invention relates to a computer monitor utility assembly structured to be mounted in association with a computer monitor in order to effectively shield the computer screen from glare, thereby reducing user eyestrain and fatigue and improving display readability, provide a convenient additional work or storage space without occupying substantially more space than the monitor itself, increasing user privacy, and conveniently, selectively and compactly orienting and concealing commonly required multi-media user accessories, in a single, adjustable, modular, and convenient way to utilize and implement the assembly.

2. Description of the Related Art

The use of computers in a variety of applications such as word processing, accounting, desk-top publishing, computer-aided drafting, engineering, programming, and spreadsheets, is now widespread. These applications demand continued use of the computer for more hours than ever before and have raised concerns about user fatigue, eye strain, headaches, neck/back muscle tension, and other related undesirable health effects. As computer usage in the workplace increases due to advances such as electronic mail, computer ordering/billing, internet advertising, computer faxing, and on-line services, reducing an employee's computer-related fatigue plays an increasingly vital role in enhancing productivity.

A primary source of user eye strain and fatigue relating to a computer monitor screen display results from excessive screen brightness and glare from external light striking the monitor screen. Typically, these lights come from overhead sources and are not independently adjustable. To help overcome the effects of light striking the monitor surface, many users increase the brightness and/or contrast settings on their monitor. Such techniques are generally not favorable, however, because in addition to dramatically increasing the strain and fatigue on the user's eyes, the computer monitor may be damaged by image burn-in, a common form of display damage. Moreover, decreasing the surrounding room lighting is often not possible due to the presence of other workers, and is generally not beneficial as a computer user must still be able to look to and see other items and documents near the computer. As such, it would be beneficial to provide a comprehensive system that is capable of selectively shading the computer monitor screen from excessive light and glare so that the user will be able to naturally reduce the brightness and contrast settings on his monitor and thus extend the monitors useful life while also reducing the strain on his/her eyes. Furthermore, such a system should not be independently glare producing or glare susceptible, such as some vertical screen filters presently available which are designed to limit the effects of monitor radiation. Rather, a system which permits necessary lighting to be available for all required tasks, but still eliminates the glare which necessitates manual screen adjustment and compensation is preferred.

An additional consideration often involved in computer use relates to those computer applications wherein the user is entering or viewing sensitive or confidential information. In the workplace, restricted information may consist of something as simple as preparing payroll checks. The close proximity of computer users in the workplace creates an enhanced demand for privacy when the user is dealing with restricted or confidential information. Typically a computer monitor screen offers no privacy to a user from other users sitting at adjacent computers. Consequently, another user or bystander is able to view the monitor screen from either side of the primary user. There is therefore a need in today's computer environment to provide an assembly which can easily and un-obtrusively maximize a user's privacy. Moreover, such a system should be capable of effectively operating with a variety of different size and configuration monitors.

Indeed, a natural reason behind the general lack of privacy between computer work stations generally relates to the amount of space that is often taken up by a computer system, and in particular a computer monitor on a worker's desk. In such environments wherein a plurality of work stations are arranged in close proximity with one another, or even in private offices or cubicles, the need for space in proximity to the computer is ever increasing. Moreover, as computers become more central to the work to be performed, users have a greater need for maintaining necessary items and storage in its vicinity for convenient access. As a result, another inconvenience associated with computer use relates to the increased demand for storage space which is either taken up by the computer and its peripheral devices, and/or which relates to usage of the computer itself. Today, computers; can be adapted to include several optional peripherals such as a microphone, speakers, mouse, digitizer pen, scanner, etc., and it is more important than ever to utilize space efficiently so as to maximize usable desk space and reduce clutter. As such there is a need for an assembly which maximizes the space usage of the computer and minimizes peripheral space that is taken up as a result of the computer and/or its accessories. Furthermore, such a space maximizing and/or storage providing structure should operate in conjunction with and should not compromise the glare minimizing structure of the system.

Looking further to the variety of peripheral items which are becoming more readily used by computer systems, the general nature of these devices often lead to space reduction, clutter and/or wire entanglement as they are routinely added to a system. In particular, most peripheral items are often added to a system gradually, as the user need arises. Because these devices must necessarily be disposed in association with the computer work area and the monitor, typically these devices are placed on or around the computer in an overlapping and unorganized manner. furthermore, other items, such as a mouse, keyboard, charts, papers, telephone, etc. are often displaced into less convenient locations because of the need to have the speakers, camera, microphone, etc. in close proximity to the monitor. As a result, there is a need for a system which in addition to other beneficial characteristics, is also capable of operatively orienting a variety of peripheral items in an accessible, yet organized, neat, and efficient manner. Furthermore, such a system should be capable of expanding with the system, accepting add on peripheral devices and integrating them into the organized array of the existing devices.

It is also noted that a majority of computer applications require a user to constantly refer to a document while typing. For example, word-processing, computer-aided drafting, and accounting applications require the user to refer to letters, drawings, spreadsheets, or like documents while typing. Typically the document is placed on a separate document stand placed near the computer, or flat on the user's desk and he/she must keep adjusting their line of sight between the computer monitor screen and the document. Furthermore, a flat document cannot be adjustably positioned to avoid excessive light and glare. In addition to being very inefficient and adding to the clutter in a work area, this practice significantly increases user fatigue due to neck, shoulder, or back muscle tension as well as eye strain and related irritation. As to separate document stands, they are sometimes difficult to utilize or effectively position, especially in circumstances where a user has limited work space around their computer on which to place and maneuver such a stand into acceptable alignment, especially since such free standing devices must necessarily take up some space in the work area.

In addition to use of a computer at a work place, computers are more and more frequently being utilized as sales aides, such as at a trade show. The computers uses in such a circumstance can range from illustrating new software or hardware capabilities, to demonstrating products and variations of a manufacturer which may or may not have anything to do with computers. One principal difficulty associated with utilizing a computer in those circumstances relates to the limited space available. For example, space at a trade show can be quite expensive and quite limited for each individual vendor. As a result, space considerations may sometimes take precedent over the desirability of utilizing a computer display. If, however, a system was provided which could maximize the space taken up by the computer monitor/display, it would greatly expand the effectiveness of the presentation by permitting the use of an adequate sized computer display without compromising any other sales considerations such as the use of printed charts and photos, and the convenient distribution of product literature.

Others in the past have attempted to provide items which may address some of the problems associated with computer use. For example, there are a variety of glare-guarding screen covers that are placed in front of the screen to minimize some glare and/or guard against screen radiation. Such devices, however, may ultimately make viewing more difficult, can diminish the clarity of an image, and cannot be used with touch screen applications. Furthermore, and as previously mentioned, because of the often intense nature of overhead lighting, such existing devices often provide a new source off of which the glare can reflect and affect the user's vision. Indeed, while other devices generally achieve some glare protection, there is still a need for a device that specifically addresses the problems of overhead glare and does so in a space saving and multi-purpose fashion such that the need to reduce glare does not compromise other necessities associated with the computer work station. Also, various external and mounted page holders exist in the secretarial field. Such conventional external page holders can take up much space directly on the work area, rarely position the document in a convenient accessible location next to the monitor due to space and size limitations, and generally remain in the way if not being used. Moreover, mounted page holders are usually either very large and obtrusive, or are substantially flimsy so as to not be able to, effectively hold multiple documents in a convenient location. Indeed, such normal page holders typically only hold the documents being worked on and do not address the needs of a user as to incoming or outgoing documents. Typically a user is left with no other choice than to take up further space with an "IN" basket or like structure, or they may merely position stacks of papers in any free area, thereby still leaving the need for convenient and stable storage. Generally, no utility item presently available addresses all of the computer user's needs in a single, solid, integrated and effective design that is capable of expanding to suit the needs of the user and/or the type of monitor on which it will be employed.

Accordingly, there is a need in the art for a computer monitor utility assembly which can significantly reduce eyestrain and fatigue, can increase the available workspace in the vicinity of the computer monitor, can effectively position a document in a readable orientation, can provide an effective trade show display, can increase user screen privacy, and can reduce computer peripheral and cable clutter, all in a single, expandable, well organized assembly.

SUMMARY OF THE INVENTION

The present invention is directed towards an improved computer monitor utility assembly to be used with a computer monitor so as to provide additional work or storage space, convenient positioning of documents, increased user privacy, reduced user eyestrain and fatigue caused by screen glare, and improved display readability, in a single multi-purpose assembly.

The improved computer monitor utility assembly includes a universal mount base. The universal mount base is structured and disposed to be securely, yet preferably removably attached to the top surface of the monitor. Operatively coupled with the universal mount base is a generally rigid top panel. The top panel is structured to have a width generally equivalent to a width of a screen of the monitor.

The present invention further includes an upper mount assembly. Specifically, the upper mount assembly is structured to adjustably secure the top panel to the universal mount base, and accordingly the monitor, such that the top panel is maintained in generally overlying relation with the monitor. Moreover, the upper mount assembly preferably overhangs the top panel beyond the front surface of the monitor. As a result, the top panel preferably provides shielding and shading to the screen of the monitor, such as from overhead lighting, so as to minimize glare evidenced to a user.

The upper mount assembly is preferably substantially secure and functions to maintain the top panel in a secure relation wherein it is capable of supporting a number of items thereon. Along these lines, the top panel preferably includes a lip disposed at least on a front end thereof. This lip functions to maintain items, such as papers, disposed on the top panel securely retained, especially if the top panel has a tilted or angled orientation. In particular, the top panel is preferably structured to achieve forward and backward slided movement relative to the mount base. As such, the top panel can selectively overhang beyond the front surface of the monitor in order to selectively shade a screen on the front surface of the monitor from light and glare to an extent desired by a user.

Further included with the improved computer monitor utility assembly of the present invention are a pair of generally rigid side panels. The side panels are structured to be mounted along the opposite side surfaces of the monitor by way of an adjustable side mount assembly. The adjustable side mount assembly is structured to facilitate mounting of the side panels along the opposite side surfaces of monitors of varying widths, and also provide for forward and backward slided movement of the side panels relative to the mount base. The side panels are structured to selectively extend beyond the front surface of the monitor, thereby effectively shading the screen on the front surface of the monitor from light and side glare, and providing substantial screen privacy.

It is an object of the present invention to provide an improved computer monitor utility assembly which increases a user's work or storage space at a computer terminal without sacrificing valuable desktop space.

An added object of the present invention is to provide a utility assembly which provides for the efficient and effective integration of a variety of peripheral utility items, such as speakers, microphones and video cameras.

An object of the present invention is to provide a monitor utility assembly which is capable of integrating peripheral items in a modular sense so as to achieve a variety of additional benefits, such as screen shading and storage space, while permitting a gradual integration of those additional components.

A further object of the present invention is to provide a monitor utility assembly which is structured to effectively store and conceal a variety of peripheral items in a useable and convenient manner.

Another object of the present invention is to provide an improved computer monitor utility assembly which minimizes user fatigue, relieves eye stress and strain, and improves monitor screen colors and readability by minimizing the amount of external light striking the surface of the monitor screen and thereby eliminating undue screen glare.

It is also an object of the present invention to provide an improved computer monitor utility assembly which allows the user to adjust the assembly so that he/she can increase or decrease the amount of light striking the surface of the monitor screen to a comfortable level.

Another object of the present invention is to provide an improved computer monitor utility assembly which provides enhanced privacy to a user dealing with sensitive, restricted, or confidential information.

An additional object of the present invention is to provide an improved computer monitor utility assembly which can effectively position a variety of computer utility items in a convenient, useable, and space maximizing orientation.

A further object of the present invention is to provide an improved computer monitor utility assembly which provides a user with a convenient and effective sales/informational display by including a display easel or informational literature holding tray with the monitor display.

Also an object of the present invention is to provide an improved computer monitor utility assembly which maintains all external, peripheral wires conveniently arranged and organized.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 20:
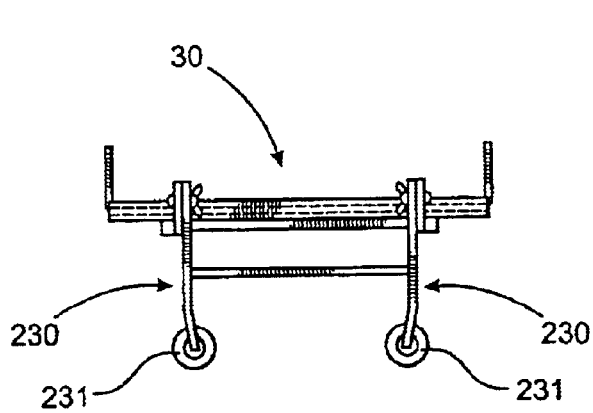
FIG. 20 is a front view of the universal mount bracket including a cantilever bracket.
Figure 21:
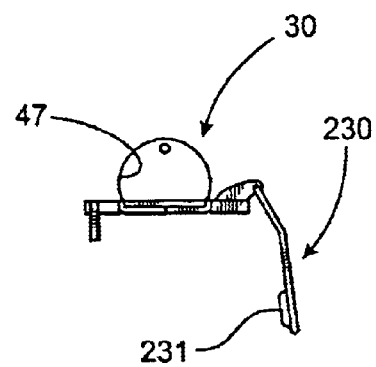
FIG. 21 is a side view of the cantilever bracket structure.
Figure 22:
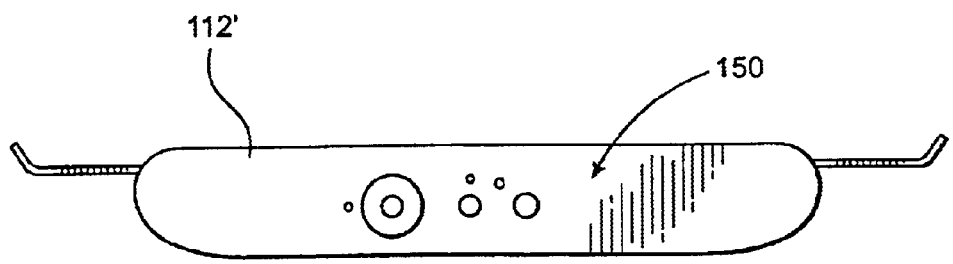
FIG. 22 is a front view of an embodiment of the top panel and utility console.
Figure 23:
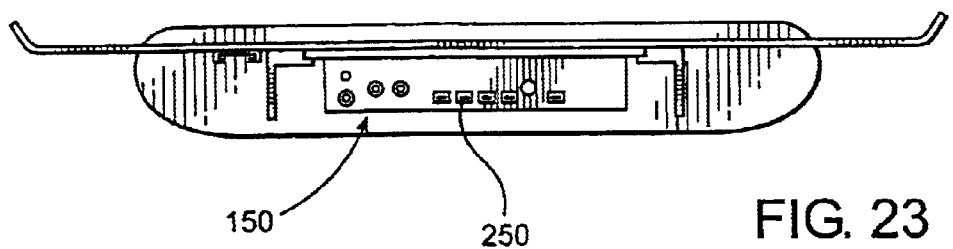
FIG. 23 is a rear view of the embodiment of FIG. 22.
Figure 24:
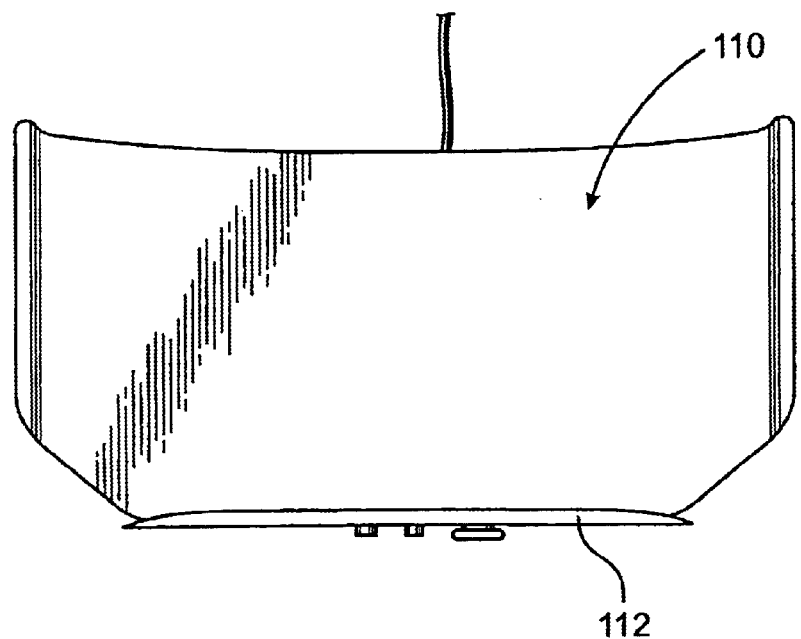
FIG. 24 is a top view of the embodiment of FIG. 22.

Shown throughout the figures, the present invention is directed towards an improved computer monitor utility assembly, generally indicated as 10. The improved computer monitor utility assembly 10 is structured to be utilized on a computer monitor 15 so as to provide a variety of utility and convenience features in a single, consolidated, multi-purpose assembly that can be adapted and expanded as required by a user. Generally, the computer monitor 15 with which the improved computer monitor utility assembly 10 of the present invention is to be used is of a standard configuration including a front surface 20, on which the screen display 26 is located, a rear surface 21, a pair of opposite side surfaces 22 and 23, a top surface 24 and a bottom surface 25. Furthermore, the standard monitor 15 is usually of the type which can swivel and pivot to provide for convenient orientation of the display screen 26 for the user. As such, the improved computer monitor utility assembly 10 is structured not to hinder or interfere with that screen adjustment by a user. Additionally, it is noted, that especially, but not necessarily when the cantilever bracket 230 of FIGS. 20 and 21 is used, the present invention may be secured to a thin monitor, such as a flat screen monitor or a monitor that forms part of a laptop or portable computer assembly.

Turning to the computer monitor utility assembly 10 itself, it includes a universal mount base 30. The universal mount base 30 is structured and disposed to preferably be removably, yet securely attached to the top surface 24 of the monitor 15, in a preferably centrally disposed orientation. Moreover, the universal mount base 30 is preferably secured generally near the front surface 20 of the monitor 15 and is structured to provide the primary secured engagement between the computer monitor utility assembly 10 and the monitor 15. Preferably, the universal mount base 30 is a substantially rigid, elongate member, and is secured to the monitor 15 by way of a substantially high density hook and loop fastener pad 46. The individual portions of the hook and loop fastener pad 46 are correspondingly secured in a substantially strong manner, by an adhesive or equivalently secure fastening structure, to the universal mount base 30 and to the top surface 24 of the monitor 15 such that they may be correspondingly secured together with the high density construction thereof maintaining the substantially secure yet removable connection. Of course, other more integral attachments including screws, clips, direct molding, adhesives and/or brackets may also be used. Also, as in the embodiment of FIGS. 20 and 21, an additional mounting structure may be provided, such as the illustrated cantilever bracket 230. As indicated, such additional mounting structure is especially beneficial for use with thinner monitors wherein a surface area for engagement is reduced. Preferably one or more of the cantilever mount brackets 230 are provided and may be disposed to extend along the front and/or rear surface of the monitor, so as to prevent tipping of the computer monitor utility assembly 10 under weight. As such, a front and rear engagement, while not required may be preferred. Furthermore, each of the cantilever brackets 230 preferably includes a contact segment 231 that actually engages the monitor, the contact segment 231 being preferably soft in nature so as to engage the monitor, allows for tightening, such as by adjusting the angle of the cantilever bracket 230, and not damage the monitor.

Figure 1:
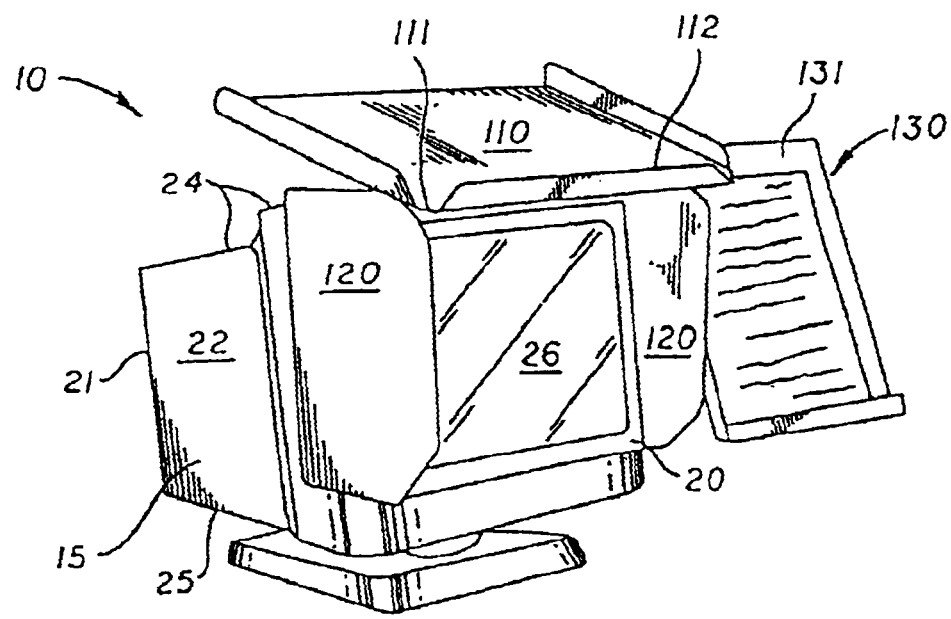
FIG. 1 is a perspective view showing the front of the improved computer monitor assembly attached to a standard monitor.
Figure 2:
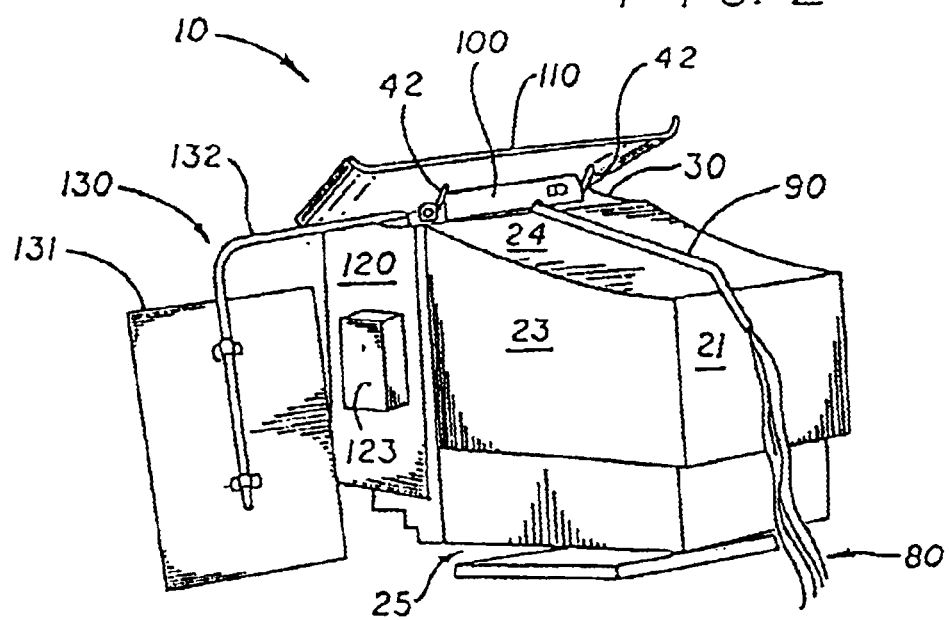
FIG. 2 is a rear perspective view of the improved computer monitor assembly attached to a standard monitor.

The computer monitor utility assembly 10 of the present invention further includes a top panel 110. The top panel 110 is structured to be secured in overlying relation atop the monitor as best shown in FIGS. 1 and 2. In the preferred embodiment, the top panel 110 is generally rigid and has a width generally equivalent to a width of at least the screen 26 of the monitor 15. Of course, this may vary. Furthermore, the top panel 110 is structured such that it may overhang beyond the front surface 20 of the monitor in order to selectively shade the screen 26 on the front surface 20 of the monitor 15 from light and glare.

Specifically, the top panel 110 is secured to the universal mount base 30 in overlying relation atop the monitor 15 by way of an upper mount assembly 40. The upper mount assembly 40, which may be incorporated with the universal mount base and therefore can be secured directly to the monitor 15 is structured to preferably provide pivotal as well as forward and backward sliding movement of the top panel 110 relative to the monitor 15. As such, the top panel 110 can be variably positioned in a desired shading orientation by the user. Indeed, by overhanging the top panel 110 substantially beyond the front surface of the monitor 15, direct overhead lighting can be substantially blocked, and a clearer, less eye straining image can be viewed. This is dramatically unlike conventional vertical shades that attempt to provide textured or other material configurations which if they reduce the glare can often reduce the quality and/or crispness of the image to the user. Of course, it is noted that some radiation screens can be effective for alternative purposes, and the present invention permits such devices to be utilized while also reducing the glare that may result from light reflection off of the screen shield itself.

In addition to achieving an effective degree of shading to the screen 26 of the monitor 15, the top panel 110 also address the important need to maximize the available space at a work area. In particular, the upper mount assembly 40 is structured to securely retain the top panel in an orientation and with sufficient strength such that a number of articles, such as papers and the like can be supportably retained on the top panel 110. This secure retention of the documents is also done at a generally elevated position above the screen 26 of the monitor 15 such that documents or other articles disposed thereon do not interfere with the viewing of the screen 26. Additionally, the top panel 110 preferably includes a lip 112 extending along a front edge 111 thereof. The lip 112 functions to substantially retain the notebooks, letters, documents, fliers, or similar materials which are placed on the top panel 110 in a convenient, out of the way, space maximizing, accessible location. Indeed, this lip 112 is especially beneficial because of the general desirability to maintain the top panel 110 in preferably a downwardly sloped orientation towards the front edge 111, as best shown in FIG. 1, thereby maximizing the shading to be achieved thereby. Also, this downwardly sloped orientation also facilitates access and/or viewing of the articles on the top platform 110 by the user, without substantial risk of those documents obscuring the user's view and/or sliding off onto the user. The top panel 110 may also include raised lips on its side edges, as shown in FIGS. 1 and 2, so that items placed on the top panel 110 cannot slide off the sides.

Figure 25:
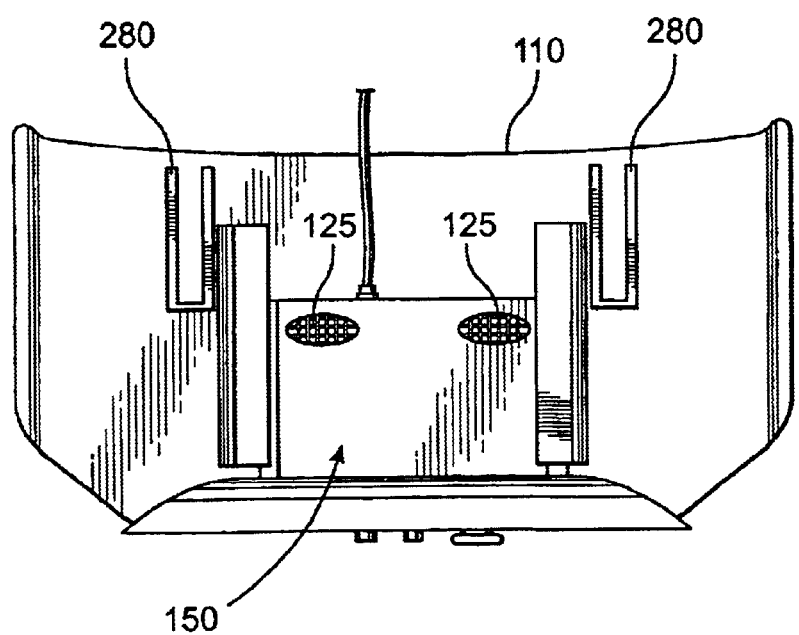
FIG. 25 is a bottom view of the embodiment of FIG. 22.
Figure 26:
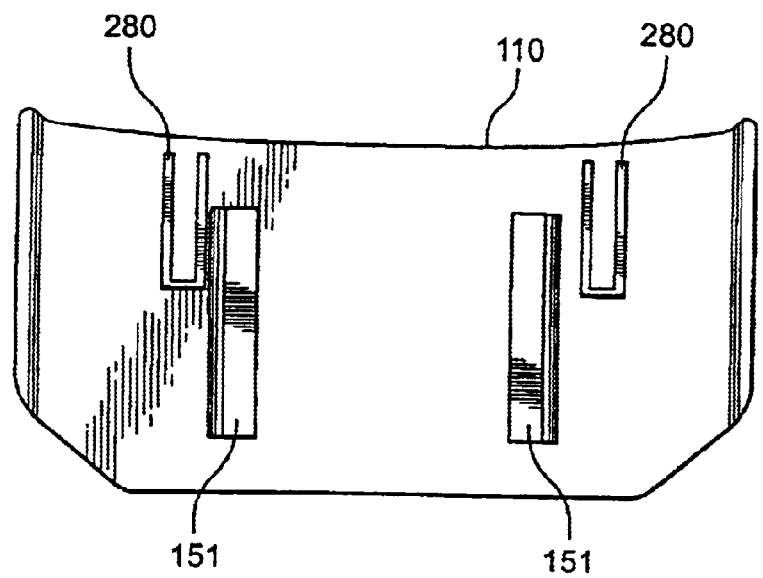
FIG. 26 is an isolated bottom view of the top panel structured to accommodate a removable utility console.
Figure 31:
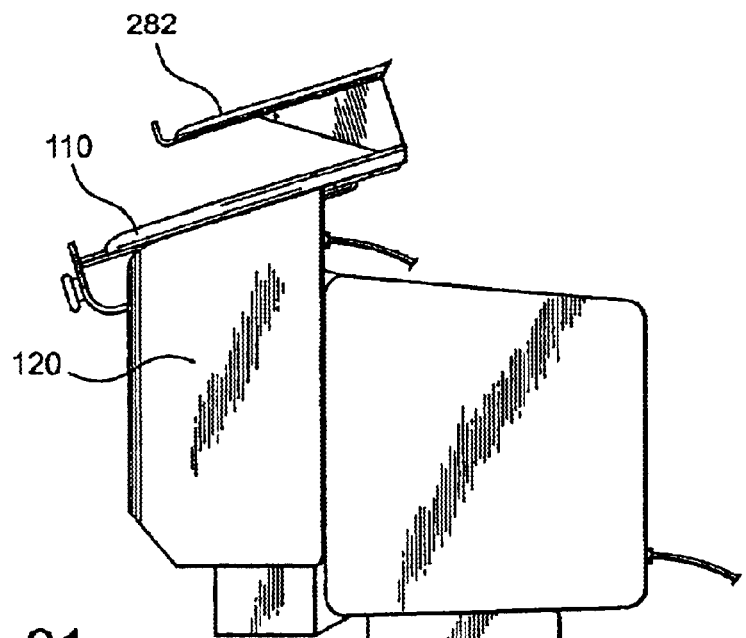
FIG. 31 is a side view of the present invention including a secondary support panel.
Figure 32:
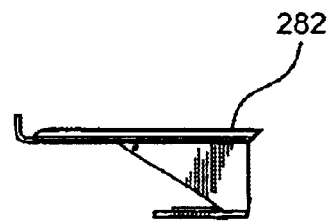
FIG. 32 is an isolated side view of the secondary support panel.

As yet another alternative, and looking to FIGS. 25, 31 and 32, a secondary support panel 282 may also be provided. The secondary support panel 282 is structured to be secured to the top panel 110 so as to provide additional storage area and define a two tiered configuration. Although the secondary support panel 282 may be fixedly and/or integrally formed with the top panel 110, in the illustrated embodiment the secondary support panel 282 is removably secured, such as by a track assembly 280. In particular, the track assembly 280 includes cooperating structure on the secondary support panel 282 and the top panel 110, such as on its underside. Accordingly, the secondary support panel 282 may be slid in place and provided as an add on if additional storage area is required. It is understood that alternate mounting structure may be provided, and the dimension as well as the number of tiers and compartments provided by the secondary support panel 282 may vary as needed.

As indicated, the upper mount assembly preferably secures the top panel 110 in a generally elevated or spaced apart relation above the monitor 15. As a result, a preferred embodiment of the present invention, as illustrated in FIGS. 8–10, 12–14 and 22–30, incorporate a utility console 150. The utility console 150 is structured to at least partially contain a plurality of peripheral components often used with computer systems. For example, in the preferred embodiment, the utility console 150 integrates and/or at least partially contains a speaker assembly, a microphone 60 and/or a computer video camera 70. As illustrated, the utility console 150 is preferably a contained housing that is secured to an underside of the top panel 110, such as by a series of tracks 151 into which the utility console may slide for appropriate positioning. Although a fixed mounting of the utility console is contemplated, the illustrated removable securement of the utility console 150' is preferred so as to achieve a modular type of assembly wherein one or more peripheral items can be added at a time, thereby allowing for future expansion as needed, while still maintaining an organized and contained structure.

Figure 10:
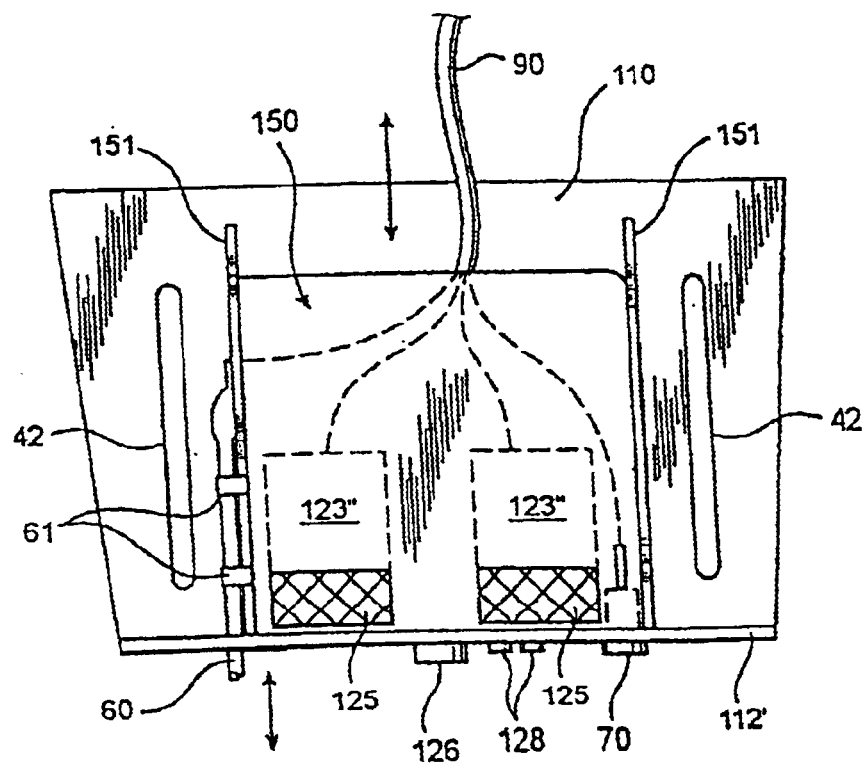
FIG. 10 is a bottom view of the top panel of the present invention including the preferred utility console.

In the preferred embodiment of the utility console 150, the speaker assembly includes a pair of speakers 123" that are audibly disposed in relation to the monitor 15 by the utility console 150. Preferably, the speakers 123" are mounted within the utility console itself so as to be well contained and compact. As a result, if removal or addition of speakers is required, such as during expansion, repair or replacement, the utility console can be removed and the speakers can be easily accessed at once. Moreover, such a configuration allows for a complete upgrade of peripheral items by removing the entire utility console and replacing it with a new one having upgraded or additional peripheral items. As illustrated in FIG. 10, the speakers 123" are preferably concealed within the utility console 150, but are preferably audible through a pair of screens 125 disposed in a bottom surface of the utility console 150, preferably near a front end thereof. As a result, and because the upper mount assembly maintains the top panel 110 to which the utility console 150 is secured generally elevated above the monitor 15, the screens 125, and possibly one or more internal baffles, direct the audio signal towards the screen 26 and front of the monitor for focused listening by the user. Indeed, because the top panel 110 is structured to overhang the monitor 15 so as to shade the screen 26, the screens 125 through which the speakers are primarily heard are focused onto the work area and are quite effective. Of course, auxiliary speakers can be easily connected to the primary speaker assembly, such as through one or more auxiliary ports, and/or other speaker assemblies as will be described subsequently can be integrated into the system, especially those systems which include more than the top panel 110 as a primary component.

As indicated, the utility console 150 also preferably accommodates a microphone 60. Increasingly, more and more applications require some form of audio input, and the advent of advanced computer telephony has made microphones a necessity in many operating systems. The utility console 150 of the present invention includes the microphone 60, either internally, or externally mounted, such as by a plurality of brackets 61. Moreover, the microphone 60 is preferably mounted in such a manner that it may be extended or retracted as needed by the user. Specifically, it is understood that the microphone may not be required in many circumstances. As a result, when not in use the microphone may present an obstacle or inconvenience to the normal use of the computer. The system of the present invention is structured such that when not in use, the microphone 60 can be retracted beneath the top panel 110 and thereby positioned out of the way. Alternatively, when use of the microphone 60 is required, and its retracted position does not provide sufficient proximity to pick up the necessary input, the microphone 60 can be pulled outward so as to extend from the from of the top panel 110 and be more effectively positioned relative to the user. Of course, the microphone 60 could also be adjustable so as to be angled downward or more towards the user with a variety of bendable or adjustable designs.

As yet another embodiment, a transceiver 242, such as for wired or wireless communication with a headset 243 may be provided. As such, the headset includes a microphone and speaker as part thereof. Furthermore, one or more USB ports 250 that are preferably externally accessible by the user and are in communicative association with a corresponding USB processor of the computer, may also be provided. Accordingly, easier accommodation and connection of certain peripheral devices may be achieved. Of course, internal connectivity to the USB port may also be provided, as may be beneficial with certain alternate embodiments as will be described in connection with the side panels.

Figure 27:
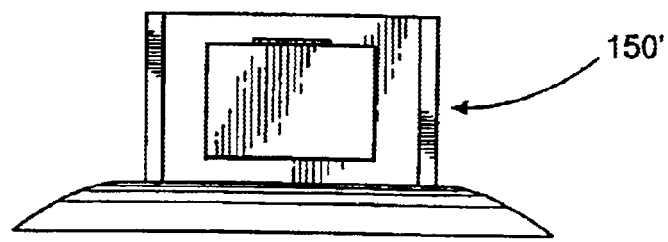
FIG. 27 is a top view of an embodiment of the utility console including a storage compartment.
Figure 28:
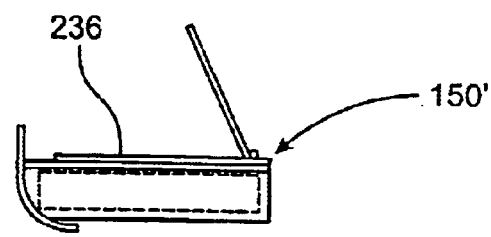
FIG. 28 is an isolated side view of the utility compartment of FIG. 27.
Figure 29:
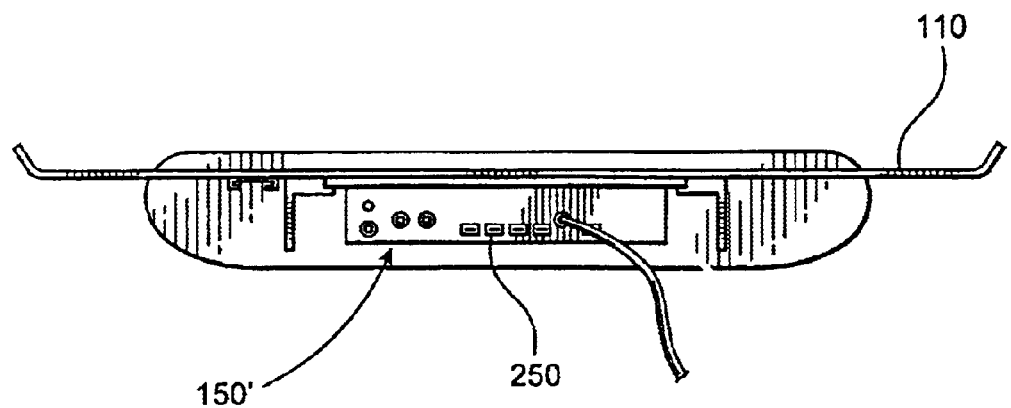
FIG. 29 is a rear view of an alternate embodiment of the removable utility console.
Figure 30:
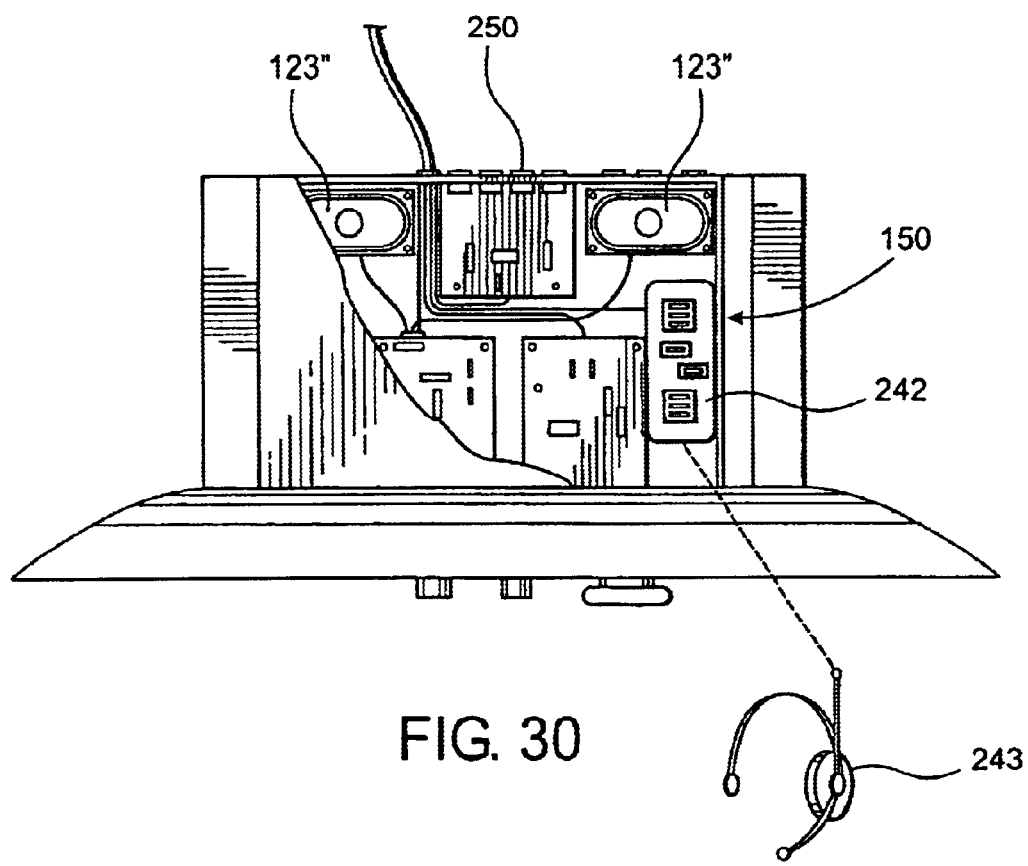
FIG. 30 is an interior view of one embodiment of the utility console.

Looking to FIGS. 27 and 28, as yet another alternative, the removable utility console 150' may include instead of or in addition to the various electronic components, a storage compartment 236. The storage compartment 236 may be open and concealed by the top panel 110, or may include a lid as in the figures.

Figure 8:
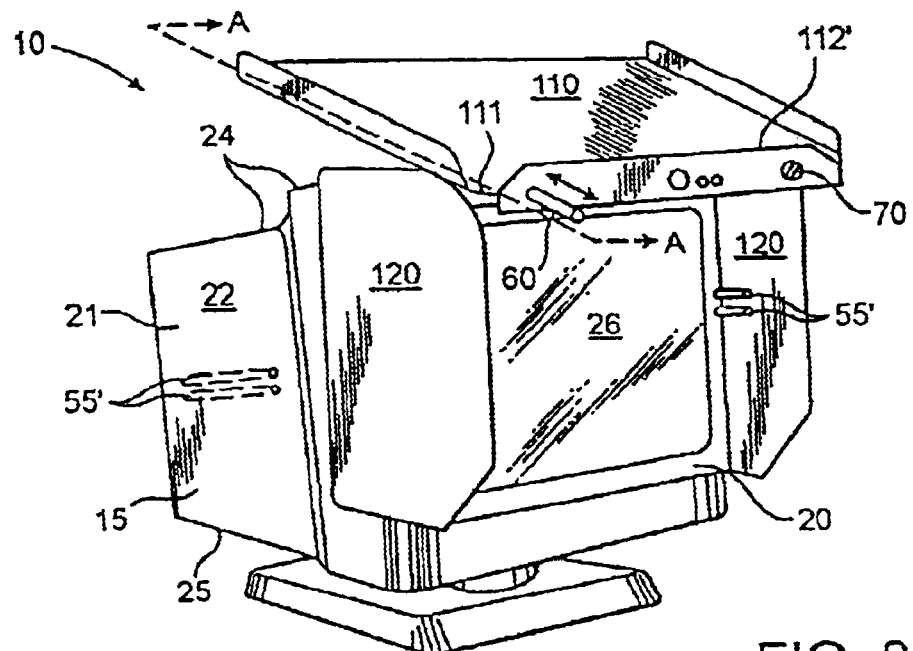
FIG. 8 is a perspective view of an alternative embodiment of the computer monitor utility assembly including the integration of the utility console.
Figure 9:
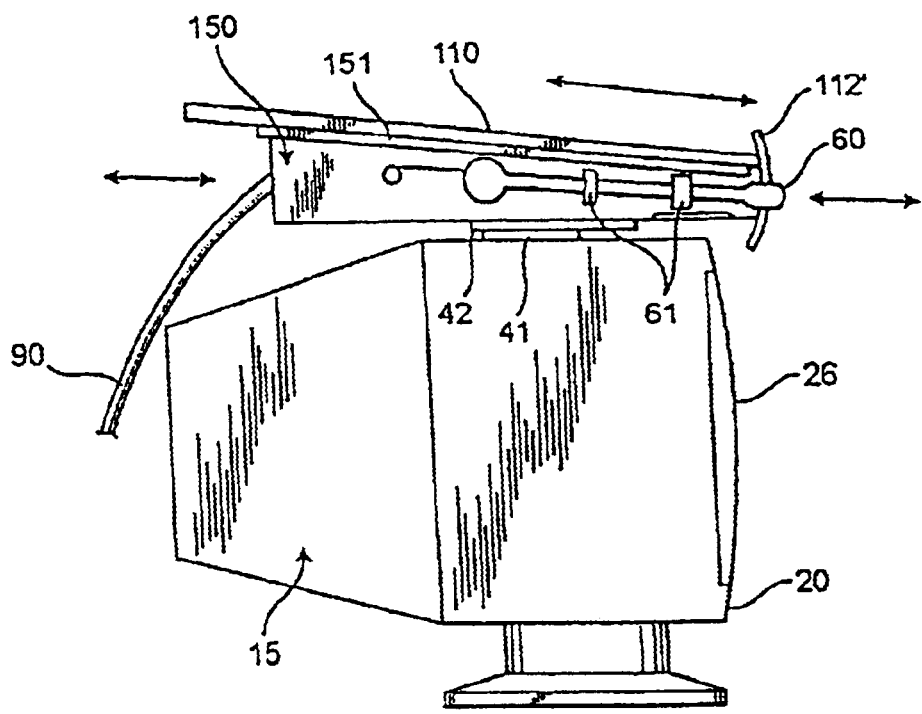
FIG. 9 is a cross section view along line A—A of FIG. 8.

As indicated, the top panel 110 preferably includes a lip 112 along its from edge to retain articles disposed on the top panel 110. In a preferred embodiment, as illustrated in FIGS. 8–10, the lip 112' at preferably the front edge of the top panel 110 may be structured to extend beneath the top panel 110. It is noted that while the preferred embodiment includes the lip 112' of unitary construction both above and below the top panel lo, it is understood that separate construction with an upper and a lower portion of the lip is also contemplated. Returning to the preferred embodiment, the lip 112' extends beneath the top panel 110 and is preferably disposed so as to confront and generally conceal the utility console 150 from direct view, indeed defining a front surface thereof. In particular, the preferred embodiment of the utility assembly incorporates a slided introduction of the utility console 150 with the top panel 110. In such an embodiment, the utility console slides into abutting engagement with the portion of the lip 112' that extends beneath the top panel 110. As a result, the utility console 150 is effectively contained, and a more uniform appearance is achieved. Furthermore, the lip 112' preferably includes a series of apertures which function to permit the exterior actuation of the peripheral items, such as the speaker assembly, microphone, etc. For example, the lip 112' is preferably configured such that a portion, such as an exteriorly actuatable switch assembly 126, of the speaker assembly protrudes therethrough. Preferably the switch assembly 126 includes an on/off and/or volume control switch. Of course, a series of other plugs, such as a headphone jack 128 or auxiliary speaker/input jacks can also be incorporated and accessible through the lip 112'. Additionally, in the preferred embodiment wherein the retractable microphone 60 is integrated, the lip 112' preferably includes an aperture through which the microphone 60 extends as needed, or into which a stationary microphone can be built. This is a similar case with a computer video camera 70 which preferably extends from the utility console 150 and projects through the lip 112' into viewing of the user utilizing the computer. Of course, it is noted that other utility items, such as a power switch and the like associated with the utility console can also be structured to protrude through the lip 112'. Furthermore, the precise positioning of each peripheral item along the lip 112' can be varied. For example, it may be desirable to center the video camera 70. Also, because of the preferred modular structure of the utility console 150 the apertures through which the various items protrude through the lip 112' can be pre-formed, with a series of caps, plates or other covers being disposed in covering relation thereon until use of that opening or port is desired. Similarly, one or more ports or outlets can be provided at a rear or side of the utility console, as needed to support or add peripheral items. Along these lines, the utility console 150 preferably includes a single cable outlet through which all of the cable as connections of the peripheral items can extend into connection with the CPU and a power source. As illustrated a cable sleeve 90 is preferably provided so as to prevent entanglement of the various wires. Also, although a central power terminal is preferably provided in the utility console 50 for all of the peripheral items, the power connection to a conventional power source or the CPU preferably also extends within the cable sleeve 90. Alternately, if a front mounting of the utility console 150 is desired, the front surface of the utility console as defined by the lip may be integral with the utility console, thereby defining the aforementioned bottom portion of the lip. Also, it is noted that the top panel need not be provided in all embodiments such that the upper portion of the lip is not required.

Figure 3:
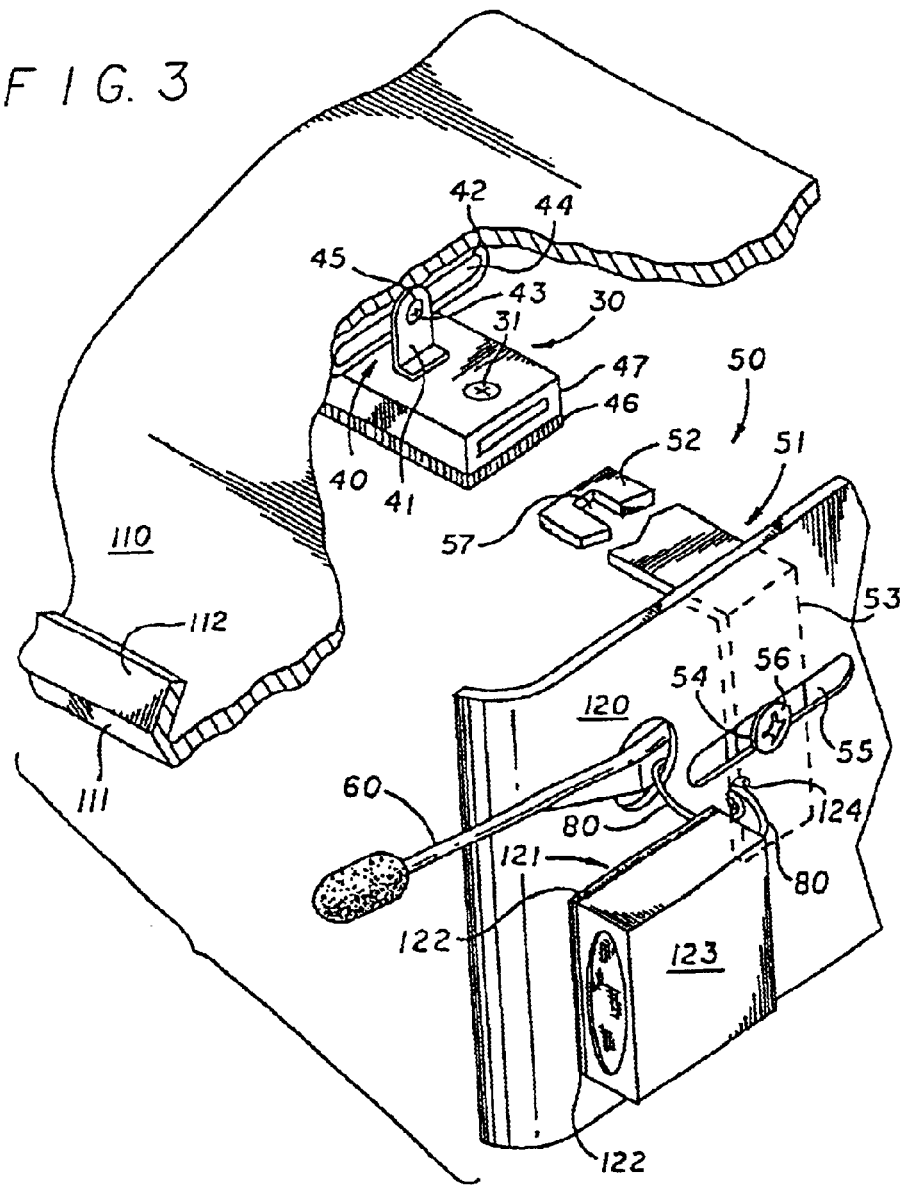
FIG. 3 is a perspective partial view of the side panel mounting to the universal mount base.
Figure 4:
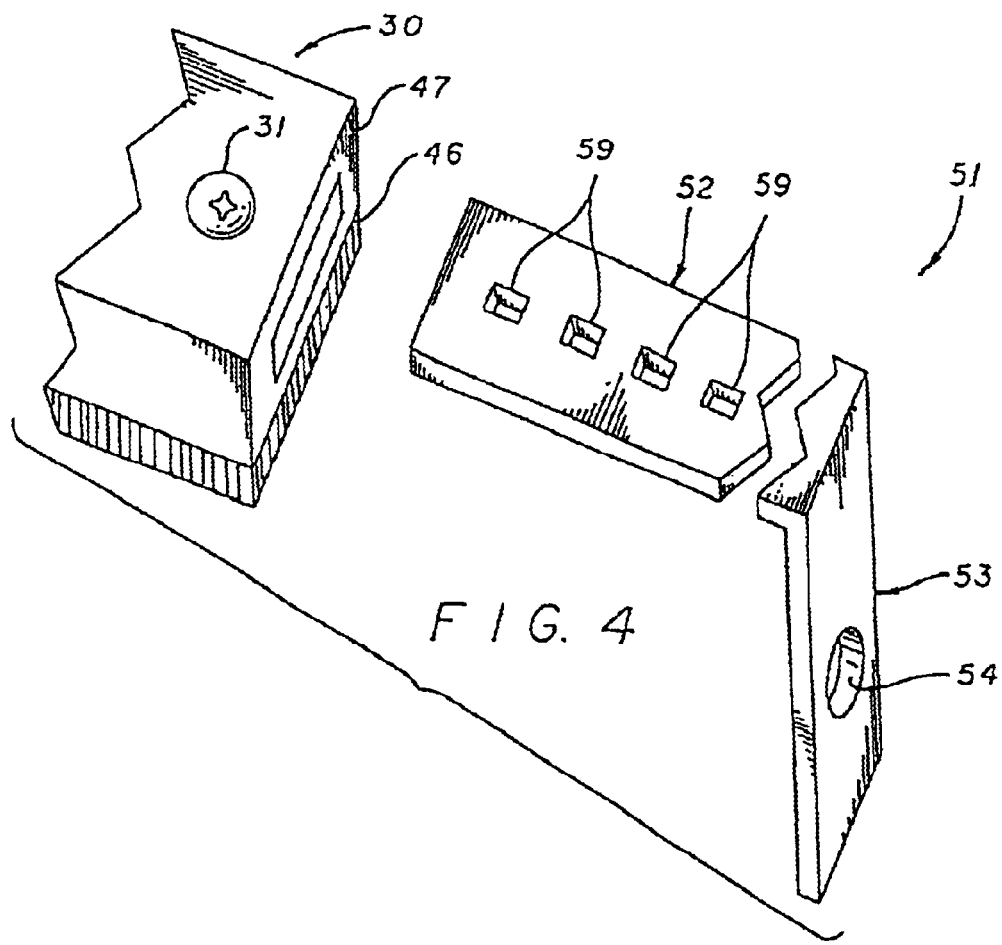
FIG. 4 is a perspective view showing an alternative embodiment of the L-shaped members.
Figure 5:
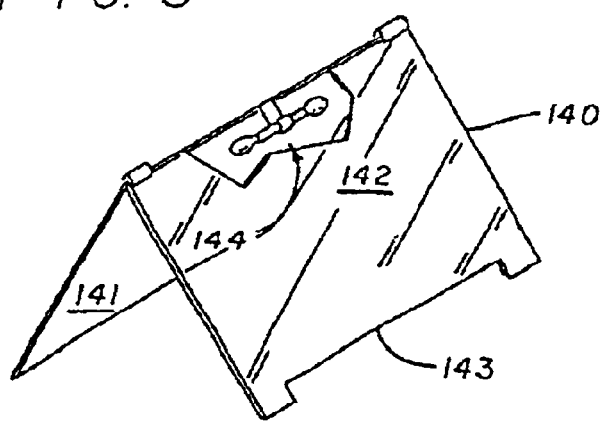
FIG. 5 is a perspective view of the display easel.
Figure 6:
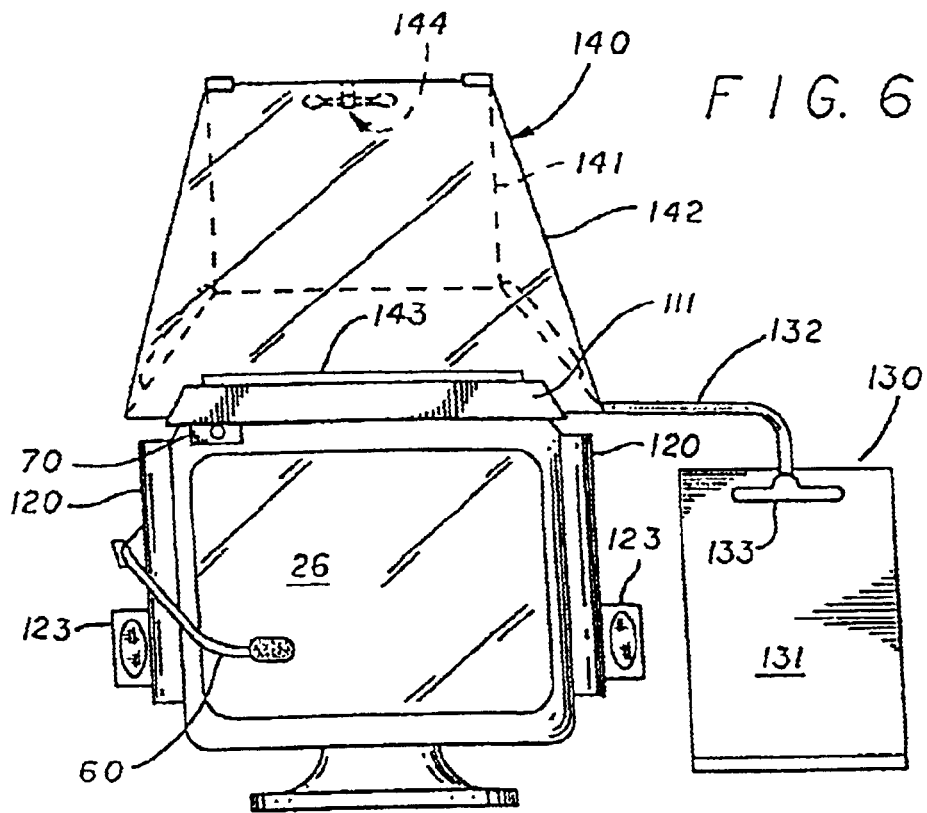
FIG. 6 is front view of the improved computer monitor assembly with the display easel in place.

Looking further to a preferred embodiment of the upper mount assembly 40, it preferably includes a pair of bracket members 41 extending upwardly from the universal mount base 30 in generally spaced apart relation from one another, as shown in FIG. 3. Further, the bracket members 41 each preferably include an aperture 43 formed therein. Disposed in generally adjacent, abutting engagement with the bracket members 41, and included as part of the upper mount assembly 40, are a pair of flanges 42. The flanges 42 are disposed in generally spaced apart relation from one another, preferably to substantially correspond the spacing between the bracket members 41, and are secured to and extend downwardly from the top panel 110. Moreover, each flange 42 preferably includes an elongate slot 44 defined therein. The bracket members 41 and flanges 42 are disposed relative to one another such that at least one, but preferably a pair of fastener elements 45 can extend through each of the apertures 43 in the bracket members 41 and through each corresponding slot 44 of the flanges 42. As such, the flange 42 is able to pivot and slide relative to the bracket members 41, and the top panel 110 correspondingly slides and pivots relative to the mount base 30 so that its position can be adjusted. Further, tightening or loosening of the fastener elements 45, such as through the use of bolts and nuts, can effectively secure the top panel in a desired position until adjustment is needed. With regard to the upper mount assembly 40, it is noted that the bracket members may be configured with elongate slots in addition to or instead of the elongate slots being disposed on the flanges alone.

A preferred embodiment of the improved computer monitor utility assembly 10 of the present invention further includes a pair of generally rigid side panels 120. The side panels 120 are structured and disposed to extend along the opposite side surfaces 22 and 23 of the monitor 15, and to selectively extend beyond the front surface 20 of the monitor 15. Accordingly, the side panels 120 substantially shade the monitor screen 26 from light and side glare, and provide a user with screen privacy. In particular, by reducing the amount of light striking the monitor screen 26, the fatigue and strain upon a user's eyes is reduced due to the improvement in the colors and readability of the monitor screen 26. Furthermore, by effectively shading the monitor from screen glare a user can reduce the monitor brightness and contrast level settings. Along with significantly reducing the strain on a user's eyes, lowering the intensity of the monitor screen's brightness and contrast levels also helps protect the monitor from image burn-in, the most common form of display damage.

The side panels 120 are secured along the opposite side surfaces 22 and 23 of the monitor preferably by way of an adjustable side mount assembly 50. The adjustable side mount assembly 50 is structured to provide forward and backward slided movement of the side panels 120 relative to the mount base 30. Accordingly, a user is able to adjust the side panels 120 to either increase or limit the amount of light striking the monitor screen 26. Moreover, if only a single side of the monitor's location results in the glare or requires privacy, each of the side panels 120 can be independently positioned to provide more or less shading.

The adjustable side mount assembly 50 preferably includes a pair of generally L-shaped members 51. The L-shaped members 51 are structured to variably extend from opposite ends of the mount base 30 and include both a horizontal leg 52 and a downwardly depending vertical leg 53. The horizontal leg 52 is structured to be adjustably secured to the universal mount base 30, and as such, a length thereof permits appropriate, adjustable positioning of the side panels 120 along the sides of monitors of varying sizes. As to the downwardly depending vertical leg 53 of each L-shaped member 51, it extends downwardly along a corresponding side surface 22 or 23 of the monitor 15 and is secured to a corresponding side panel 120.

Figure 11:
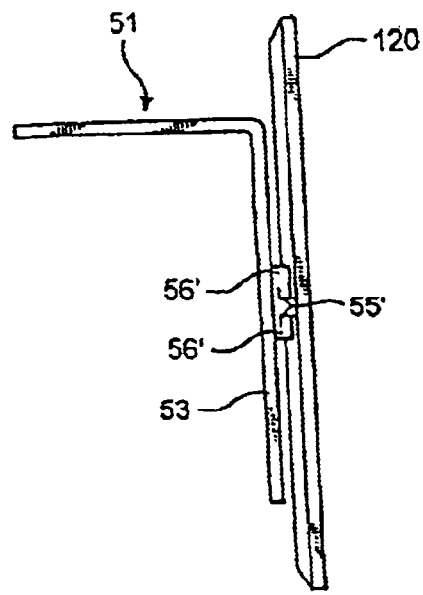
FIG. 11 is an isolated rear view of an L-shaped member and side panel of the present invention including a track structure for adjustment purposes.
Figure 12:
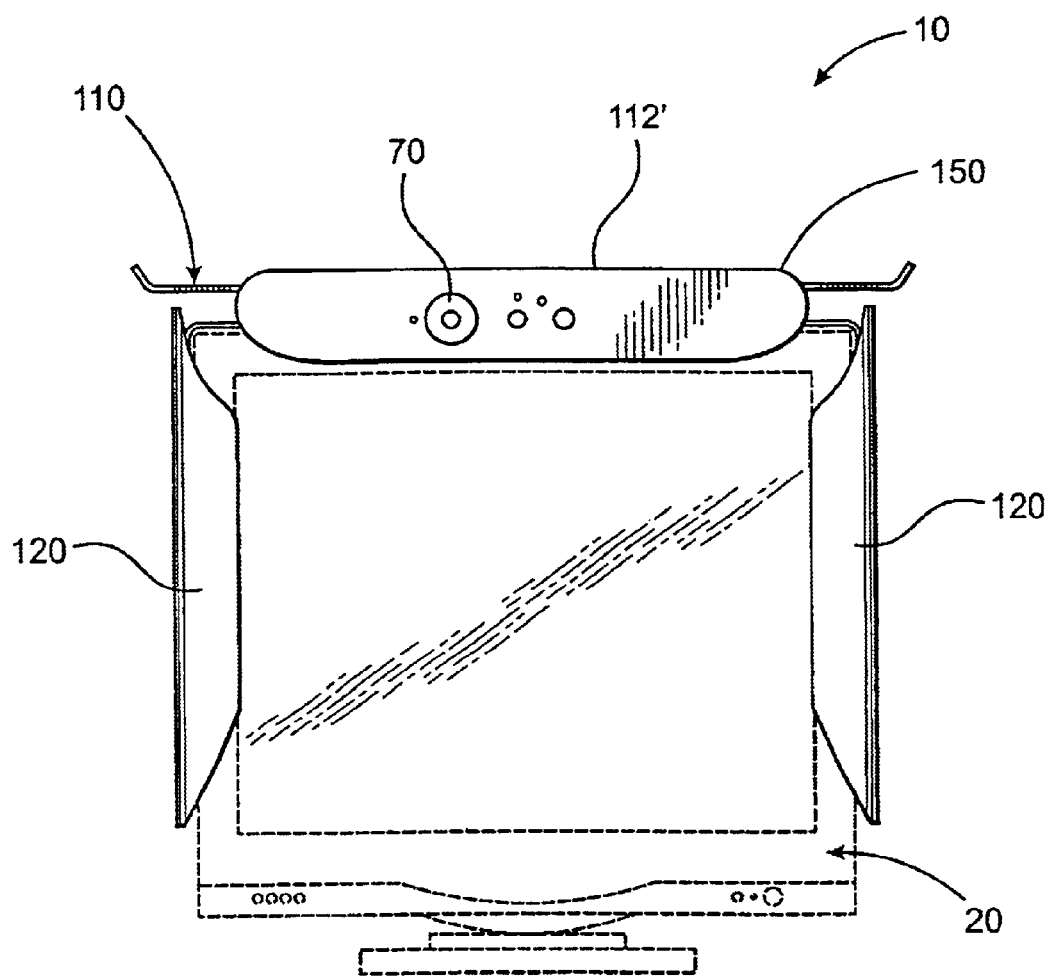
FIG. 12 is a front view of another embodiment of the present invention wherein a front surface of the utility console is accessible to the user.
Figure 13:
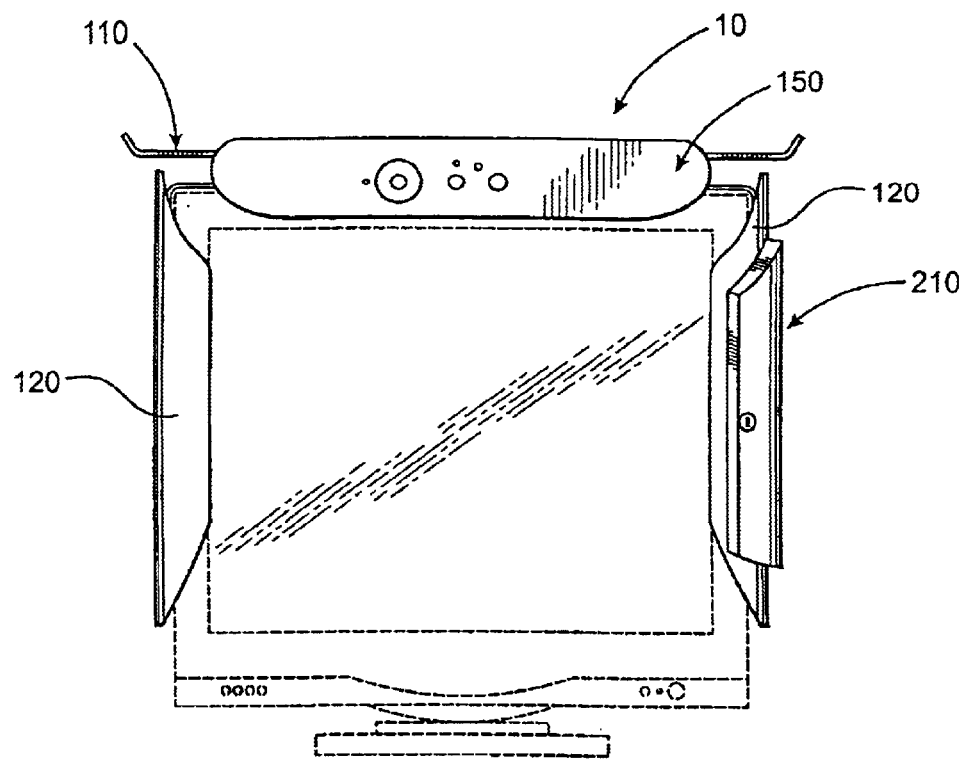
FIG. 13 is a front view of the present invention illustrating a removable embodiment: of the utility compartment disposed on a side panel.
Figure 14:
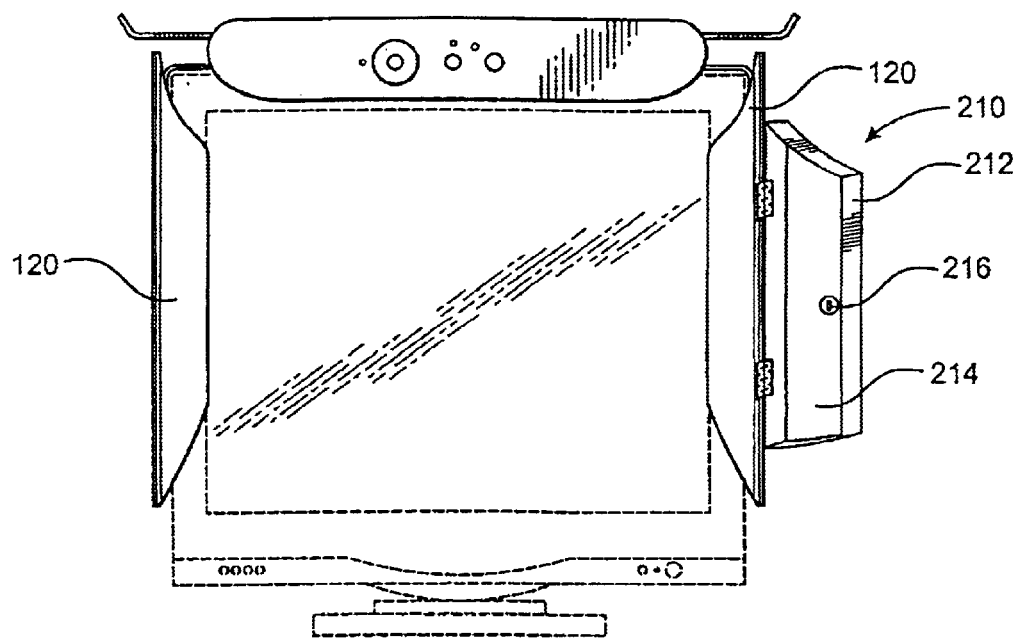
FIG. 14 is a front view of the present invention illustrating the utility compartment disposed on a side panel including a cover assembly.

In a first preferred embodiment, each of the vertical legs 53 of the L-shaped members 51 includes a bore 54 formed therein, and each of the side panels 120 includes a slot 55 formed therein. As such, the side panels are disposed in abutting relation with the vertical legs 53 of the L-shaped members 51 such that each of the slots 55 overlies a corresponding one of the bores 54 for receipt of a fastener element 56 therethrough. As such, relative slided movement of the side panels 120 is achieved. It should be noted that the slot may be equivalently be disposed in the vertical legs either in addition to or in place of the slot in the side panels. Further, any alternative configurations, such as a mating track and ridge or alternative sliding guide member may be equivalently implemented so long as it provides for slided movement of the side panels 120 relative to the monitor 15. For example, as best seen in FIGS. 8 and 11, a track structure may be provided on the vertical legs 53 of the L-shaped members 51 and on the interior of the side panels 120. In the preferred embodiment, a pair of outwardly protruding track elements 551 mate with a pair of inwardly protruding track elements 56', thereby maintaining alignment and retention of the side panels 120 upon slided movement thereof.

As previously recited, the horizontal leg 52 of each of the L-shaped members 51 is preferably structured to be adjustably secured to the universal mount base 30. Accordingly, in the preferred embodiment, the universal mount base 30 includes a generally tubular member 47 structured and disposed to receive the horizontal leg 52 of each of the L-shaped members 51 into opposite sides thereof. In a preferred embodiment, the adjustable side mount assembly 50 includes an elongate slot 57 formed in the horizontal leg 52 of each of the L-shaped members 51. A fastener element 31 extends from the universal mount base 30 through each of the elongate slots 57 in the horizontal legs 52, thereby providing for variable spacing of the vertical legs 53 of the L-shaped members 51 relative to the universal mount base 30. Similarly, in an alternative embodiment, the horizontal legs 52 of the L-shaped members 51 may include a plurality of spaced openings 59 rather than a single elongate slot 57. The spaced openings 59 will be structured to selectively receive an adjustable positioning element 31 secured to the universal mount base 30. Still, however, it is seen that mere frictional engagement between the horizontal legs 52 of the L-shaped members 51 and the universal mount base 30 may also achieve secured, adjustable interconnection.

Figure 34:
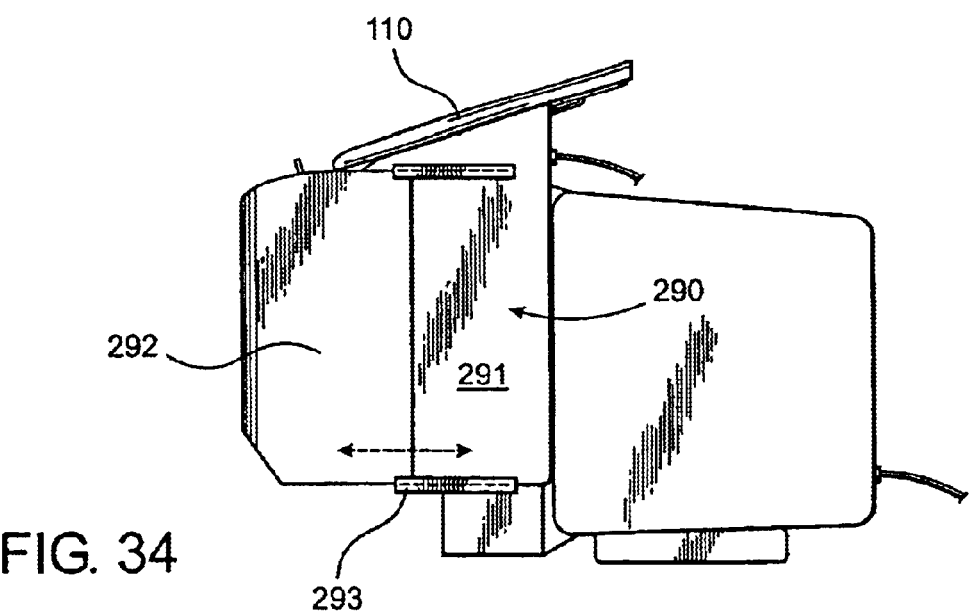
FIG. 34 is an illustration of an alternate embodiment of the side panels.

Looking to FIG. 34, in yet another embodiment of the side panel 290, a main segment 291 of the side panel 290 may be non-movably, yet possibly removably, secured to the universal mount base. To provide a varied degree of shading, an extension segment 292 is adjustable secured, to the main segment 291. Although a varied number of adjustable interconnections may be defined, in the illustrated embodiment, a track structure 293 may be provided.

Further included with the improved computer monitor utility assembly 10 in a preferred embodiment is at least one adjustably positionable page holder assembly 130. The page holder assembly 130 is configured to increase desktop space and reduce neck stress and fatigue by suspending documents at eye level for viewing or data-entry purposes. The page holder assembly 130 preferably adjusts to different angles and heights to allow the user to view a document in the best lighting and glare-reducing perspective and maximum user comfort, and may fully retract along a side of the monitor when not in use. Moreover, the page holder assembly 130 is structured to extend the page forward such that a document is visible despite the extended positioning of the side panels 120 in a shading orientation.

The page holder assembly 130 includes primarily a holder panel 131. The holder panel 131 is structured and disposed to be movable between a retracted and operative position. In the retracted position, the holder panel 131 extends along the side surface 22 or 23 of the monitor 15. In the operative position, however, the holder panel 131 is suspended generally adjacent the front surface 20 of the monitor so that a document disposed on the holder panel 131 is easily viewable by a user viewing the front surface 20 of the computer monitor as best shown in FIG. 1. In the preferred embodiment, the page holder assembly 130 also includes an elongate, rigid, generally L-shaped support rod 132. The support rod 132 is pivotally secured preferably to the horizontal leg 52 of an L-shaped member 51 or directly to the universal mount base and is adjustably secured to the holder panel 131 so that the holder panel 131 is adjustably suspended in an operative position. Alternatively, when not in use, the support rod 132 permits the holder panel 131 to completely swivel out of the way into a retracted position flush against the computer monitor. Moreover, the holder panel 131 includes a support assembly 133 structured and disposed to support an article such as loose documents or a legal pad visibly on the holder panel 131. The support assembly 133 may include a clipboard type of clamp located at the top or bottom or even both ends of the holder panel 131, or alternatively as a lip at a lower edge of the holder panel 131.

Figure 33:
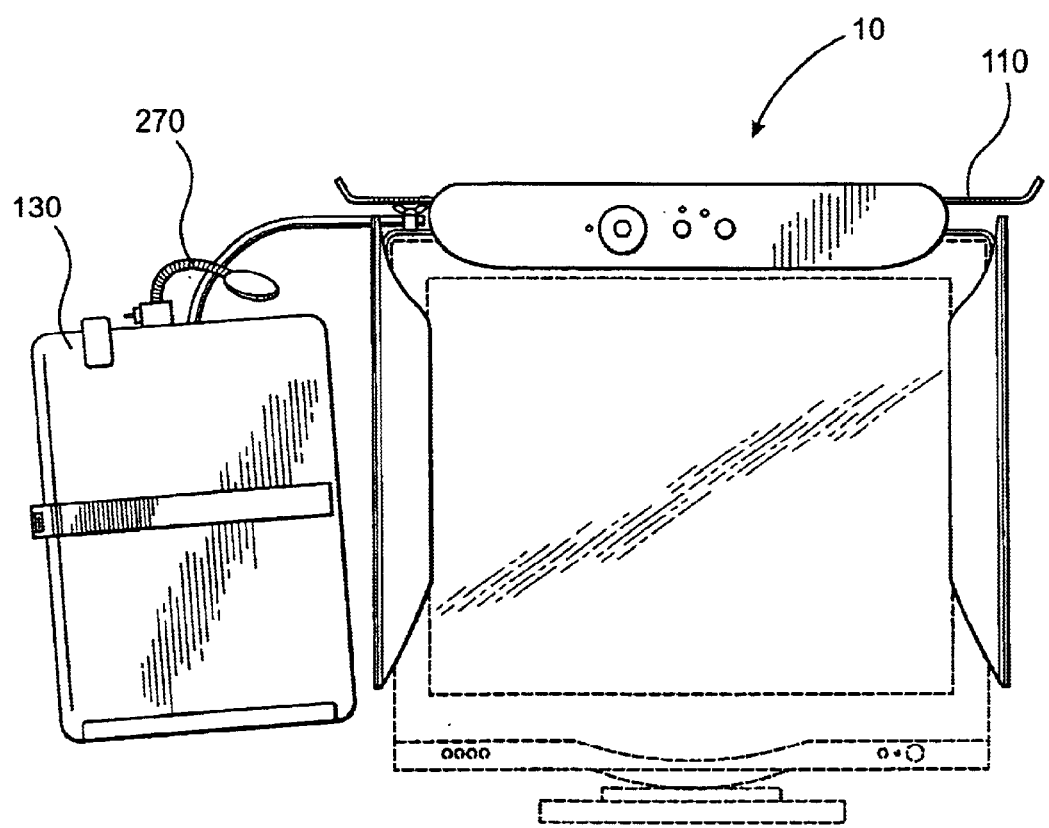
FIG. 33 is a front view of an embodiment of the page holder including an illumination assembly.

Additionally, as in FIG. 33, an illumination assembly 270 may be provided so as to illuminate an article on the page holder assembly 130. The illumination assembly 270 may include a small lamp, which it is recognized, may be secured at any part of the present computer monitor utility assembly 10.

In an alternative embodiment, the top panel 110 of the improved computer monitor utility assembly 10 is structured and disposed so that it can securely support a display easel 140 to facilitate the visible presentation of various display articles over the monitor 15. In particular, the display easel 140 preferably includes a pair of hinged panels 141 and 142 which are hingedly secured to one another along their respective top edges. At least one of the hinged panels 141 and 142 includes a lower edge cutout 143 which is structured and disposed to facilitate the secured engagement of the front panel 142 with the lip 112 on the front edge 111 of the top panel 110, and may even be structured to permit informational papers to be accessibly contained thereunder. In the preferred embodiment, the display easel 140 is at least partially translucent and includes back lighting means 144 structured and disposed to back light any display articles disposed on the easel 140.

The computer monitor utility assembly 10 may also be configured so as to be fully adaptable and accommodating to the various computer peripherals offered in the industry in a variety of alternative manners. Consistent with the theme to increase functional workspace, the improved computer monitor assembly 10 is designed to support various computer cables and peripherals in a manner which frees usable desk space and reduces overall clutter. As such, the improved computer monitor utility assembly 10 may include: a computer microphone 60 adjustably and operatively secured preferably to one of the side panels 120. Although a smaller microphone may be included for mounting to any portion of the assembly, in the preferred embodiment an elongate, swivelable microphone will be included such that it may extend from the side panel 120 towards the user when necessary. Moreover, an alterative embodiment of the improved computer monitor utility assembly 10 may also include a computer video camera 70 adjustably mounted in a similar manner to one of the side panels 120 or beneath the top panel 110 so as to effectively capture a person utilizing the computer.

Further, the improved computer monitor utility assembly 10 may include a speaker mount assembly 121 on each of the side panels 120. The speaker mount assembly 121 is structured and disposed to provide for the removable mounting of external computer speakers 123 onto the side panels 120. In this embodiment, the speaker mount assembly 121 will be secured by way of a high density hook and loop fastener pad 122 matingly disposed on each of the external computer speakers 123 and each of the side panels 120. It is understood, however, that a mount bracket may also be included as a speaker mount assembly 121, and in fact the speakers 123 may be integrally mounted with the side panels 120.

Figure 7:
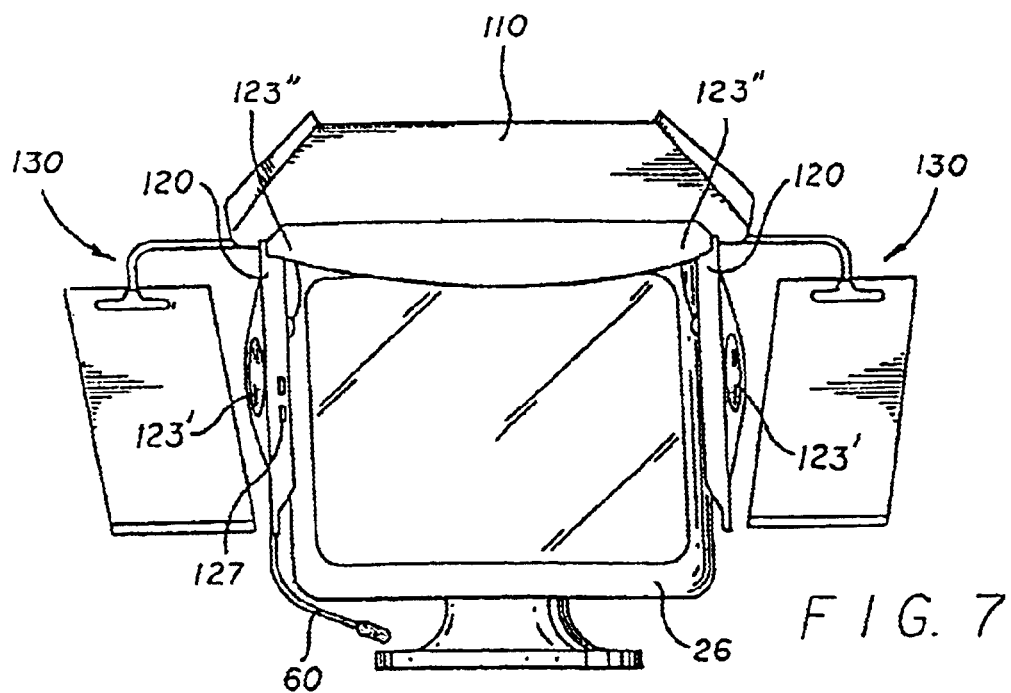
FIG. 7 is a perspective view of an alternative embodiment of the improved computer monitor assembly including built in speakers.

Furthermore, in another alternative embodiment, the computer speakers 123' may be integrally molded into the side panels 120, as illustrated in FIG. 7. Such a configuration permits a narrower, more finished profile to be achieved and facilitates internal wiring and greater stability. Similarly, a plurality of plugs or jacks for facilitated connection to various types of external component plugs, or switches and controls, such as a volume control may also be molded or otherwise secured to one or both of the side panels 120. In this regard, one switch preferably includes an audio mode selection switch 127. The audio mode selection switch 127 is structured to permit a user to select between normal audio and "personal sound" audio. Specifically, in some instances, the normal volume of external speakers may be to great, and too difficult for the computer user to hear if kept too low, and/or privacy may sometimes be desired with regard to the audio being heard. As such, as a further embodiment of the present invention, a pair of interior, focused speakers 123" may be included and disposed on an interior surface of one or both side panels 120. Accordingly, when both side panels are disposed so as to shield the monitor screen, a low level audio can be focused directly at the user. Subsequently, merely by actuating the audio mode selection switch 127 normal audio can be reestablished.

As can be appreciated, in any multi-media computer set up, a number of peripheral cables are included and directed towards the CPU. In order to conveniently direct and store those various peripheral cables utilized, in a preferred embodiment, the side panels 120 preferably include at least one aperture 124 formed therein which is structured to receive any peripheral or utility cable 80 extending from a utility item disposed on the side panel 120. As such, the aperture facilitates the concealed, organized passage of any utility cables along the L-shaped members 51 to the universal mount base 30, such as by clips and the like. Also, in the preferred embodiment, a cable sleeve 90 extends from the mount base 30 and is structured to receive all of the utility cables 80 and provide organized passage of the utility cables 80 towards the rear surface 21 of the monitor. Furthermore, a transformer 100 may be secured to the mount base 30 so as to receive corresponding utility cables 80 therein and direct a single power cable to the power supply.

Looking to FIGS. 13–19, if desired, one or more utility compartments 210 may be secured to one or both side segment 120. The utility compartment 210 may be integrally secured and or completely removable relative to the side panel 120. Further, in the illustrated embodiment, a cover assembly 212 may be provided so as to at least temporarily conceal an interior 214 of the utility compartment 210. The cover assembly 212 may be hingedly secured to the side panel 120, as illustrated, so as to allow for opening and closing, or it may be completely removably, such as using pins, clips, clamps, magnets, etc. Moreover, the cover assembly 212 itself may define and contain the interior 214 as an independent structure or with cooperating structure on the side panel. Further, as illustrated, a lock assembly 216 may be provided so as to secure the utility compartment 210 and maintain articles disposed therein.

Figure 15:
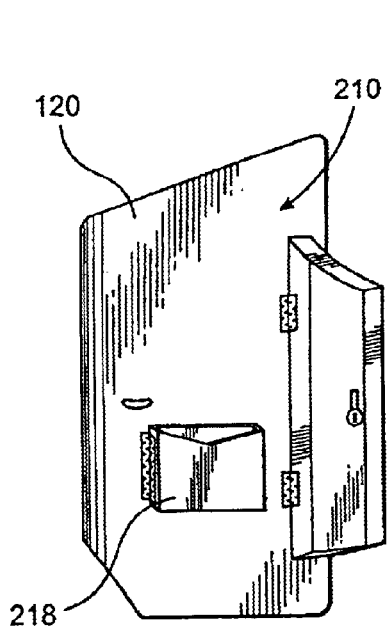
FIG. 15 is an isolated view of the utility compartment including a storage assembly.
Figure 16:
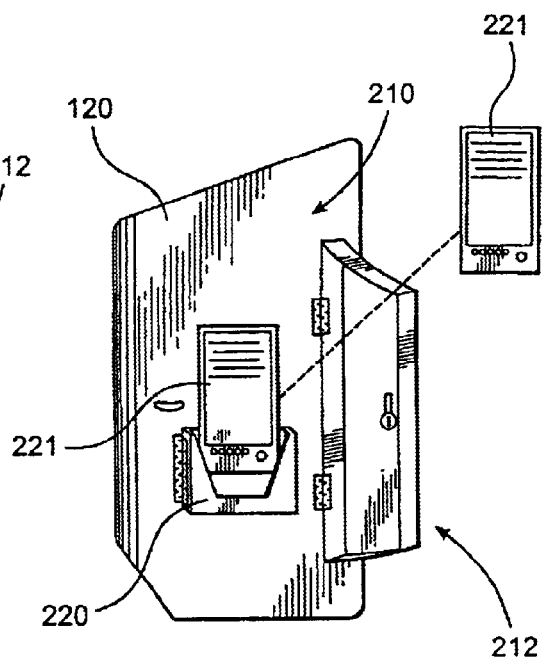
FIG. 16 is an isolated view of the utility compartment including a PDA interface port.
Figure 17:
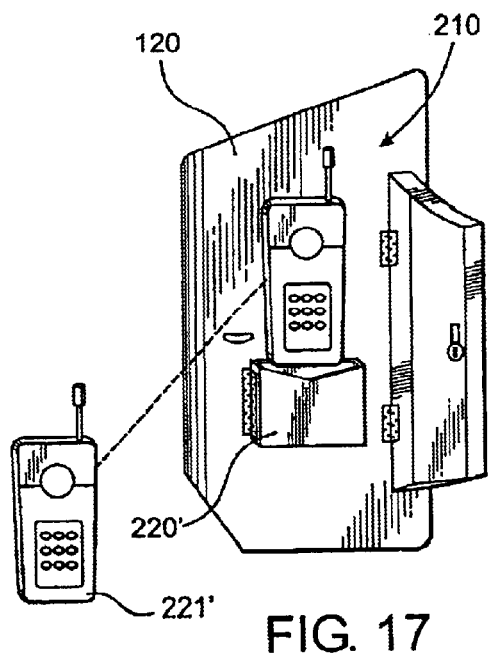
FIG. 17 is an isolated view of the utility compartment including an alternate peripheral interface port.
Figure 18:
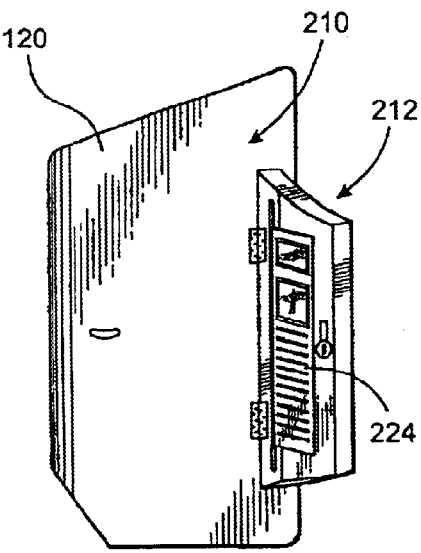
FIG. 18 is an isolated view of the utility compartment including an adjustable panel therein.
Figure 19:
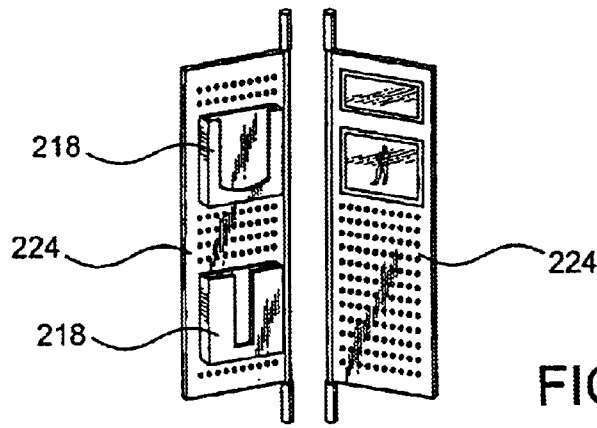
FIG. 19 is an isolated view of the adjustable panel to be disposed in the utility compartment.

Looking to FIG. 15, a storage assembly 218 may be defined in the utility compartment 2210. The storage assembly 218 may be fixed or removable and may be provide in a variety of configurations depending upon the needs of the user. Also, the storage assembly 218 may be secured to the side panel 120 or to the cover assembly 212. As in FIGS. 18 and 19, however, if even further storage and/or functionality is required, one or more adjustable panels 224 may be disposed in the utility compartment 210. These adjustable panels 224 may be hingedly secured in place so as to allow selective access to the components on each one. Moreover, a peg board or other adjustable structure may be provided so as to allow for variability in the positioning and orientation of the one or more storage assemblies 218 or other components. With regard to alternate components that may be provided in the utility compartment 210 with or without the storage assembly 218,a peripheral interface port 220, 220' may be provided. The peripheral interface port 220, 220' is preferably communicatively associated with the computer processor assembly, such as directly or via a USB or other port in the utility console 150, thereby providing convenient functionality at the side panel(s) 120. Looking to FIG. 16, the peripheral interface port includes a PDA interface port 220, such as a docking and/or re-charging cradle. As such, a standard PDA (personal digital assistant) may be effectively interfaced and maintained in a conveniently accessible location. As in the embodiment of FIG. 17, the peripheral interface may relate to any of a variety of peripherals, including a cellular telephone 221', computer pointer, tape drive, etc.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. To enhance the effectiveness of a computer monitor of the type having a pair of primary surfaces, including a front surface and a rear surface, a pair of opposite side surfaces, a top surface and a bottom surface, a monitor utility assembly comprising:

a universal mount base structured and disposed to be securely attached to the monitor, a generally rigid top panel, an upper mount assembly structured and disposed to secure said top panel to said mount base, in overlying relation atop the monitor, said upper mount assembly being further structured to overhang said top panel beyond the front surface of the monitor in order to selectively shade and screen a screen on the front surface of the monitor from light and glare, a utility console, said utility console disposed between said universal mount base and said upper mount assembly;

said utility console including a front surface accessible by a user; and said top panel including a lip disposed at least on a front edge thereof, said lip being structured and disposed to retain at least one article placed on said top panel.

2. The monitor utility assembly as recited in claim 1 wherein said utility console includes a speaker assembly.

3. The monitor utility assembly as recited in claim 1 wherein said utility console includes a USB processor and at least one USB port externally accessible by the user, said USB processor being communicatively associated with a computer processor assembly associated with the monitor.

4. The monitor utility assembly as recited in claim 1 Wherein said utility console includes a transceiver disposed therein, said transceiver operatively associated with a corresponding peripheral device.

5. The monitor utility assembly as recited in claim 1 wherein said utility console includes a camera assembly, a lens of said camera assembly exposed via said front surface.

6. The monitor utility assembly as recited in claim 1 wherein said utility console is at least partially removable.

7. The monitor utility assembly as recited in claim 1 wherein said universal mount base is structured to be at least partially secured at the top surface of the monitor.

8. The monitor utility assembly as recited in claim 1 further comprising a secondary support panel, said secondary support panel structured to be disposed in spaced apart relation above said top panel so as to support an article thereon.

9. The monitor utility assembly as recited in claim 1 further comprising a pair of generally rigid side panels, said side panels structured and disposed to at least partially shield a side of the screen of the monitor.

10. The monitor utility assembly as recited in claim 1 further including at least one adjustably positionable page holder assembly, said page holder assembly including a holder panel and being structured and disposed to be moveable between a retracted position, wherein said holder panel extends along the side surface of the monitor, and an operative position, wherein said holder panel is operatively suspended generally adjacent the front surface of the monitor such that an article supportably disposed on said holder panel is easily viewable by a user viewing the front surface of the monitor.

11. The monitor utility assembly as recited in claim 4 wherein said peripheral device includes a wireless headset.

12. The monitor utility assembly as recited in claim 6 wherein said utility console includes a storage compartment.

13. The monitor utility assembly as recited in claim 7 wherein said universal mount base includes a cantilever bracket structured to engage one of said primary surfaces of a thin monitor so as help maintain engagement therebetween.

14. The monitor utility assembly as recited in claim 8 wherein said secondary support panel is removably secured to said top panel.

15. The monitor utility assembly as recited in claim 8 wherein said top panel and said secondary support panel are removably secured with one another by a track assembly.

16. The monitor utility assembly as recited in claim 9 further comprising an adjustable side mount assembly structured and disposed to provide forward and backward, slided movement of said side panels such that said side panels selectively extend beyond the front surface of the monitor.

17. The monitor utility assembly as recited in claim 9 further comprising an illumination assembly operatively secured to at least one of said side panels.

18. The monitor utility assembly as recited in claim 9 further comprising a utility compartment defined on at least one of said side panels.

19. The monitor utility assembly as recited in claim 10 Further comprising an illumination assembly operatively secured to said page holder assembly.

20. The monitor utility assembly as recited in claim 11 wherein said wireless headset includes a microphone.

21. The monitor utility assembly as recited in claim 15 wherein said track assembly is at least partially disposed on an underside of said top panel.

22. The monitor utility assembly as recited in claim 18 wherein said utility compartment includes a cover assembly structured to at least temporarily enclose an interior of said utility compartment.

23. The monitor utility assembly as recited in claim 18 wherein said utility compartment includes a PDA interface port disposed therein, said PDA port structured to receive a PDA communicatively associated therewith.

24. The monitor utility assembly as recited in claim 18 wherein said utility compartment includes a peripheral interface communicatively associated with a computer processor assembly associated with the monitor and structured to receive a peripheral device communicatively associated therewith.

25. The monitor utility assembly as recited in claim 18 wherein said utility compartment includes a storage assembly.

26. The monitor utility assembly as recited in claim 18 wherein said utility compartment includes a plurality of adjustable panels defined therein, each of said panels structured to receive a utility item functionally secured thereto.

27. The monitor utility assembly as recited in claim 11 wherein said wireless headset includes a speaker.

28. The monitor utility assembly as recited in claim 22 further including a lock assembly structured to secure said cover assembly in a closed orientation on said utility compartment.

29. The monitor utility assembly as recited in claim 23 wherein said PDA interface port is communicatively associated with a computer processor assembly associated with the monitor.

30. To enhance the effectiveness of a computer monitor of the type having a pair of primary surfaces, including a front surface and a rear surface, a pair of opposite side surfaces, a top surface and a bottom surface, a monitor utility assembly comprising:

a universal mount base structured and disposed to be securely attached to the monitor, a utility console, said utility console secured to said universal mount base;

said utility console including a front surface accessible by a user;

a pair of generally rigid side panels, said side panels structured and disposed to at least partially shield a side of a screen of the monitor; and an adjustable side mount assembly structured and disposed to provide forward and backward, slided movement of said side panels such that said side panels selectively extend beyond the front surface of the monitor.

31. The monitor utility assembly as recited in claim 30 wherein said side mount assembly is structured to vary a spacing between said side panels so as to accommodate monitors of varying widths.

32. The monitor utility assembly as recited in claim 31 wherein said utility console includes a speaker assembly.

33. The monitor utility assembly as recited in claim 31 wherein said utility console includes a USB processor and at least one USB port externally accessible by the user, said USB processor being communicatively associated with a computer processor assembly associated with the monitor.

34. The monitor utility assembly as recited in claim 31 wherein said utility console includes a transceiver disposed therein, said transceiver operatively associated with a, corresponding peripheral device.

35. The monitor utility assembly as recited in claim 31 wherein said utility console includes a camera assembly, a lens of said camera assembly exposed via said front surface.

36. The monitor utility assembly as recited in claim 31 wherein said utility console is at least partially removable.

37. The monitor utility assembly as recited in claim 31 wherein said universal mount base is structured to be at least partially secured at the top surface of the monitor.

38. The monitor utility assembly as recited in claim 31 further comprising an illumination assembly operatively secured to at least one of said side panels.

39. The monitor utility assembly as recited in claim 31 further including at least one adjustably positionable page holder assembly, said page holder assembly including a holder panel and being structured and disposed to be moveable between a retracted position, wherein said holder panel extends along the side surface of the monitor, and an operative position, wherein said holder panel is operatively suspended generally adjacent the front surface of the monitor such that an article supportably disposed on said holder panel is easily viewable by a user viewing the front surface of the monitor.

40. The monitor utility assembly as recited in claim 31 further comprising a generally rigid top panel structured to be disposed in overlying relation atop the monitor.

41. The monitor utility assembly as recited in claim 34 wherein said peripheral device includes a wireless headset.

42. The monitor utility assembly as recited in claim 36 wherein said utility console includes a storage compartment.

43. The monitor utility assembly as recited in claim 37 wherein said universal mount base includes a cantilever bracket structured to engage one of said primary surfaces of a thin monitor so as help maintain engagement therebetween.

44. The monitor utility assembly as recited in claim 40 further comprising an upper mount assembly structured and disposed to secure said top panel to said mount base, said upper mount assembly being further structured to overhang said top panel beyond the front surface of the monitor in order to selectively shade and screen a screen on the front surface of the monitor from light and glare.

* * * * *